United States Patent [19]

Burth et al.

[11] Patent Number: 5,409,509
[45] Date of Patent: Apr. 25, 1995

[54] PROCESS TO COMBAT HARMFUL ORGANISMS ORIGINATING IN SEEDS OR SOIL BY MEANS OF SEED TREATMENT

[75] Inventors: Ulrich Burth, Kleinmachnow; Guenter Motte, Potsdam; Petra Mueller, Kleinmachnow; Rainer Mueller, Kleinmachnow; Marga Jahn, Kleinmachnow; Kerstin Lindner, Potsdam; Joachim Pflaumbaum, Blankenburg; Friederun Scholze, Quedlinburg; Klaus Gaber, Dresden, all of Germany

[73] Assignee: Gesellschaft fuer umweltschutz-beratung und-technik Gbr, Quedlinburg, Germany

[21] Appl. No.: 916,121

[22] PCT Filed: Jan. 31, 1991

[86] PCT No.: PCT/EP91/00181
§ 371 Date: Sep. 30, 1992
§ 102(e) Date: Sep. 30, 1992

[87] PCT Pub. No.: WO91/11095
PCT Pub. Date: Aug. 8, 1991

[30] Foreign Application Priority Data

Jan. 31, 1990 [DE] Germany .................. 3374182
Jan. 31, 1990 [DE] Germany .................. 3374190

[51] Int. Cl.⁶ ............... A01H 1/00; C12N 1/14; C12N 1/20; A01N 63/00
[52] U.S. Cl. .................. 47/58; 435/252.1; 435/252.5; 435/253.3; 435/254.1; 435/256.3; 47/57.6; 424/93.46; 424/93.47; 424/93.5
[58] Field of Search ............ 47/57.604, 57.605, 57.614, 47/1.304, 58, 57.6, DIG. 8, DIG. 9; 435/243, 252.1, 252.5, 253.3, 254.1, 256.3; 424/93.46, 93.47, 93.5

[56] References Cited

U.S. PATENT DOCUMENTS

| | | | |
|---|---|---|---|
| 4,302,670 | 11/1981 | Zaderej | 250/324 |
| 4,633,611 | 1/1987 | Schiller | 47/1.3 |
| 4,798,723 | 1/1989 | Dart et al. | 424/93 |

FOREIGN PATENT DOCUMENTS 238715 9/1986 German Dem. Rep.
250456 10/1987 German Dem. Rep.
8501878 9/1985 WIPO.

*Primary Examiner*—David T. Fox
*Assistant Examiner*—E. F. McElwain
*Attorney, Agent, or Firm*—Birch, Stewart, Kolasch & Birch

[57] ABSTRACT

A process for combating harmful organisms on seeds wherein said seeds are treated by irradiation with low-energy electrons in combination with application of microorganisms antagonistic to said harmful organisms.

11 Claims, No Drawings

PROCESS TO COMBAT HARMFUL ORGANISMS ORIGINATING IN SEEDS OR SOIL BY MEANS OF SEED TREATMENT

BACKGROUND OF THE INVENTION

The present invention relates to a process to combat harmful organisms originating in seeds or soil by means of seed treatment. The process according to the present invention is intended for the treatment of agricultural, horticultural or forestry seeds, in particular for grain.

It is known that harmful organisms which are seed-transferrable, i.e. adhere to the surface of a seed, and/or are within a seed and which damage the germinating seed and the young plants in the soil are combated with the aid of chemical and physical seed-treatment methods prior to sowing. In particular, prior to their use the grain seeds are subjected to a dressing procedure by which the spreading of such harmful organisms is to be prevented or restricted.

A chemical seed treatment using chemical dressing agents has however many disadvantages, such as toxicity for warm-blooded animals, resistance phenomena that can be observed with harmful organisms after an extensive use of dressing agents, phytotoxic effects on the cultivated plant, insufficient adhesion of the dressing agent to the seeds and negative effects on man and environment by biologically highly efficient chemical substances.

As for physical methods in which the seeds are heated up to a temperature critical to microbial harmful organisms by means of light of different wavelengths, microwaves, water vapour, hot air, etc., only hot water dressing has temporarily gained some importance. However, such dressing agents are relatively difficult to handle. The use of high energy rays ($\gamma$ rays, X-rays) to combat microbial harmful organisms is not possible on seeds because the necessary radiation dose for achieving a fungicidal effect on the seeds is phytotoxic or mutagenic.

It is already known in the prior art that seeds are subjected to an irradiation with low energy electrons in vacuum or in a free atmosphere to combat harmful organisms (DD-PS 242 337, DD-PS 238 715, U.S. Pat. No. 4,633, 611). Electron energy and radiation dose are chosen such that microbial harmful organisms are killed without any produce-affecting or phytotoxic effects on the germ of the seed corns. This method has the advantage that the seeds treated in this way will not be a hazard to people during sowing and will not pollute the environment with toxic substances. However, irradiation with low energy electrons has turned out to be unsatisfactory because seed-transferrable harmful organisms are not or only partly combated in the deep layers of the seed corn and in the seed germ and because the seeds are exposed to the attack of soil-borne harmful organisms in an unchecked and unprotected way after sowing.

Biological combating methods which employ microbial antagonists to combat fungal harmful organisms are nowadays suggested more and more often (cf., e.g., DD-PS 250 456, EP-A-304178, U.S. Pat. No. 4 798 723, etc.). In this respect the use of microbial antagonists against various seed-borne and soil-borne fungal organisms with a harmful effect is suggested. Bacterial antagonists, such as Bacillus spp., Streptomyces spp., Pseudomonas spp., Penicillium spp., Trichoderma spp. are inter alia used. However, the good fungicidal effects of these antagonists found under laboratory conditions at optimum temperatures of more than 20° C. have not always been confirmed by outdoor tests, and there is considerable uncertainty about the effects thereof.

As far as an efficiency improvement is concerned, one knows that microbial antagonists are mixed with fungicides and that these mixtures are used for seed treatment (cf., e.g., DE-OS 23 52 403, DE-OS 27 40 052, DD-PS 26 74 420).

SUMMARY OF THE INVENTION

It is therefore the object of the present invention to provide a seed treatment process which makes it possible in an ecologically acceptable way to combat seed-borne harmful organisms of seeds in an efficient way even in cases where these organisms colonize the deep regions of the seeds or seed corns and which efficiently protect the seeds or seed corns against any attack by soil-borne harmful organisms even after sowing, in particular from the phase of germination to the phase of the fully developed young plant.

This object is attained in accordance with the invention in that the seeds are subjected to a combined treatment consisting of an irradiation with low energy electrons and an application of active chemical substances and/or biological materials.

Surprisingly enough it has been found that a synergistic action against seed-borne and soil-borne harmful organisms without any produce-affecting phytotoxic effects is achieved through the combination of seed irradiation with low energy electrons and subsequent use of antagonistic microorganisms and/or their culture broths, culture filtrates or antibiotic metabolic products on the seeds. An advantageous predisposition to a substantially improved colonization of the seeds by the microorganisms used according to the invention or a permanent deposition of culture filtrates or antibiotic metabolic products on the seeds is attained through the process of the invention. optionally, active fungicidal substances per se or in combination with microbial antagonists or synergists may be used in conjunction with electron beam treatment.

In a preferred embodiment of the present invention the seeds are treated with a chemical and/or biological application immediately after the irradiation of the seeds with low energy electrons in a continuous procedure. A high seed throughput and an especially uniform treatment of the seeds are thereby ensured.

On the other hand, it is also possible to carry out the biological and/or chemical application for the seeds treated with low energy electrons only before or during sowing. The latter may especially be of advantage when the antagonistic bacteria and/or fungi used exhibit an expecially high efficiency on the electron-treated seeds within a narrow time interval after application onto the seeds.

In another preferred embodiment of the present invention, the seeds are subjected to an irradiation with low energy electrons and an application of antagonistic bacteria and/or fungi which remain on the surface of the seeds and/or in the near surface region and/or deep region of the seed corn and/or colonize a surface region of the hypocotyl of the seed corn and/or undergo the root associations and symbioses with an embryo plant following from the seed and/or from mycorrhiza.

Depending on the type of seeds and the target group of harmful organisms and on the microbial antagonists or synergists used in response thereto, it is preferred that antagonistic microorganisms and mycorrhiza fungi are used as a growing cell or in their dormant form in conjunction with carrier substrates on the seeds.

On the other hand, the use of antagonistic microorganisms and micorrhiza fungi as culture broths is preferred, or the use of bacterial and fungal antagonists and, in addition, the culture filtrates and metabolic products thereof as an application to the electron-irradiated seeds.

The antagonistic activities take preferably take place within a temperature range of from 0.5° to 35° C., in particular within a range of from 6° to 15° C.

As for a biological treatment with microbial antagonists, antagonistic bacteria that were deposited under the Budapest Treaty and under the deposition mark IMET 11424, IMET 11425 IMET 11426, IMET 11427, IMET 11428 at the official depositary institution Nationale Sammlung von Mikroorganismen, Institut für Mikrobiologie und experimentelle Therapie (IMET) (National Collection of Microorganisms, Institute for Microbiology and Experimental Therapy (IMET), Beutenbergstraße 11, 0-6900 Jena, Germany (formerly: Zentralinstitut für Mikrobiologie und experimentelle Therapie der Akademie der Wissenschaften der DDR (Central Institute for Microbioloy and Experimental Therapy of the Academy of Sciences of the German Democratic Republic) DDR-6900 Jena, Beutenbergstraße 11) have turned out to be especially efficient in the case of wheat grains.

The strains IMET 11424 through IMET 11428 were deposited on Dec. 7, 1989.

The strains IMET 43920, IMET 43921 and IMET 43922 were deposited on Dec. 7, 1989.

The strains IMET 43923 and IMET 43924 were deposited on Jan. 5, 1990.

Taken singly or in combination with the above-mentioned bacteria, especially the antagonistic fungi deposited at the above-mentioned official depository institution IMET under the designations IMET 43920, IMET 43921, IMET 43922, IMET 43923, IMET 43924 have turned out to be efficient as a microbial application. The above-mentioned antagonistic bacteria and/or antagonistic fungi are preferably used in a concentration of from $10^4$ to $5 \times 10^{10}$ cfu/ml or g.

Tests have shown that harmful organisms are combated in an especially efficient way when the microbial applications are used in an amount of from 10 to 500 ml or g per 100 kg of seeds.

The bacteria and/or fungi which are used in accordance with the invention and exhibit antagonistic effects against seed-borne and soil-borne harmful organisms and which are used, in combination with the seed treatment with low energy electrons, on seeds are of a type which remains on the seed surface or in the near surface area of the seeds, or are microorganisms which colonize the surface area of the hypocotyl, microorganisms which form root associations with the roots of the young plants, or symbiotic microorganisms or mycorrhiza fungi.

The use of culture filtrates and antibiotic metabolic products within the scope of the inventive process can be carried out either before the irradiation of the seeds with low energy electrons or after the irradiation of the seeds with low energy electrons. The latter is preferred in many cases because the electron beam treatment of seeds creates especially advantageous preconditions for the subsequent colonization or deposition of antagonistic microorganisms, the culture broths, culture filtrates or antibiotic metabolic products thereof and thus ensures an especially efficient seed treatment.

The microbial treatment of the seeds is preferably carried out in an integral procedure following the preceding irradiation of the seeds with low energy electrons. It is also possible within the scope of the present invention to effect a colonization of bacteria and/or fungi with antagonistic effects only immediately before or during the sowing of the seeds which have been treated with low energy electrons.

Surprisingly enough, results have been achieved in the combat against harmful organisms through the combination of a seed irradiation with low energy electrons and the application of active chemical substances and/or biological material, in particular organisms with an antagonistic action, that are considerably better than the results achieved through an exclusive seed treatment with organisms having an antagonistic action or through the irradiation with low energy electrons, respectively.

The special advantages of the present invention which yields considerably improved combating results within a broader spectrum of action reside in the features that the seeds are colonized by the microbial organisms rapidly and in an unhindered way due to the combination of the irradiation of seeds with low energy electrons and the subsequent deposition of antagonistic microorganisms, so that a high antagonistic activity is achieved.

The culture filtrates and antibiotic metabolic products used in accordance with the present invention exhibit a high and long-lasting activity on and in the seeds.

Within the scope of the present invention microorganisms are preferably used which develop their antagonistic activity within a wide range of temperature of from 0.5° to 35° C., preferably between 6° and 15° C. The application of biological material in conjunction with the irradiation of the seeds with low energy electrons has the advantage that the organisms used according to the invention and their application forms do not affect the environment because these are soil microorganisms and fungi which occur naturally at any rate on cultivated land used agriculturally or horticulturally.

Microbial antagonists such as Bacillus spp., Pseudomonas spp., Trichoderma spp., Chaetomium spp., Epicoccum spp., Penicillium spp. (IMET 11424, IMET 11425, IMET 11426, IMET 11427, IMET 11428, IMET 43920, IMET 43921, IMET 43922, IMET 43923, IMET 43924), yeasty microorganisms and other known antagonists against fungal harmful organisms have turned out to be especially suited for a use within the scope of the seed treatment process of the invention (depositary institution and date, see above).

Within the scope of the present process it is preferred that either living cells, spores or metabolic products are directly applied as culture filtrates or that compositions based on living cells, spores or metabolic products of different antagonists are applied onto the seeds immediately after the irradiation of the seeds with low energy electrons in vacuum. $10^4$ to $5 \times 10^{10}$ cfu/ml or g of the application form are employed when living cells and/or spores are used. The various application forms are preferably used at an amount of from 10 to 500 ml or g per 100 kg of seeds. Apart from conventional carrier materials the application forms may contain nutrients for the used bacteria and/or fungi for improving the colonization of the seeds, as well as bonding agents.

Furthermore, within the scope of the inventive process active fungicidal substances may be used together with the microbial antagonists, or instead of these antagonists, in an electron dressing process.

The present invention shall now be explained in more detail with reference to embodiments. These relate to the treatment of grain seeds with biological material after the irradiation of the seeds with low energy electrons in vacuum. The efficiency of the process of the invention for combating harmful organisms through seed treatment using bacteria and fungi after the irradiation of the seeds with low energy electrons has been demonstrated in vitro and in vivo.

DETAILED DESCRIPTION OF THE INVENTION Example 1

Colonization of seeds with antagonistic microorganisms

Wheat seeds of the variety "Miras" were colonized with antagonistic microorganisms (fluorescent Pseudomonad IMET 11426 and Trichoderma strain IMET 43922) directly and after the irradiation with low energy electrons. The irradiation of the seeds was preferably carried out in the way as shown in DD-PS 242 337. The contents of this publication is also made the subject matter of the disclosure of the present application by explicit reference thereto.

During colonization the fluorescent Pseudomonad IMET 11426 was applied to wheat seeds at $10^7$hu 7 cfu/ml and the Trichoderma strain IMET 43922 at $10^7$ cfu/ml at a liquid amount of 4 1/100 kg of seeds. After three days the colonization of the two seed amounts with antagonistic microorganisms was checked under earth-moist conditions. A survival rate of $2\times10^7$ cfu/ml could be detected on the seed amount to which the fluorescent Pseudomonad IMET 11426 had been applied after treatment with low energy electrons, and a survival rate of $10^5$ cfu/ml could be detected on the seed amount to which the Trichoderma strain IMET 43922 had been applied following an irradiation of the seed amount with low energy electrons. On the other hand, there were survival rates of $10^5$ cfu/ml (fluorescent Pseudomonad) and $10^3$ cfu/ml (Trichoderma strain), respectively, on wheat seeds which had been subjected to the above colonization with antagonistic microorganisms without any irradiation by low energy electrons.

EXAMPLE 2

Combat against seed-borne harmful organisms

Wheat seeds of the variety "∓Miras" were irradiated in vacuum with low energy electrons (55 keV, 6 kGy) and, following the electron irradiation of the wheat seeds, a Bacillus spp. (IMET 11427) was applied at $5\times10^7$ cfu/ml to a control and a Trichoderma spore suspension (IMET 43923) was applied to another one at $10^7$ cfu/ml with a liquid amount of 4 1/100 kg seeds under laboratory conditions.

After the germination of the seeds it was determined how harmful fungal organisms are combated in the deep layers of the seed corn. In the untreated control with electron irradiation 86% of the seeds germinated normally without being attacked by fungi, and 14% of the seeds that had germinated abnormally or not at all were attacked by fungal harmful organisms. After the use of Bacillus spp. 93% of the seeds germinated in a normal way and, out of the seeds that had not or only abnormally germinated, only 5% of the seeds were attacked by fungal harmful fungal organisms. In another case 94% of the seeds germinated normally in the control treated with Trichoderma spore suspension and 4% were attacked by fungal harmful organisms out of the seeds that had not or only abnormally germinated.

EXAMPLE 3

Protection of the germinating seed corn and the embryo plant against the attack of harmful organisms Wheat seeds of the variety "Alcedo" were treated in accordance with the above Example 1 and various bacteria (IMET 11424, IMET 11425, IMET 11426, IMET 11427, IMET 11428) and fungi (IMET 43920, IMET 43921, IMET 43922, IMET 43923, IMET 43924) were made to colonize on the seeds according to Example 1. These wheat seeds were placed on malt media in the immediate vicinity of punched-out agar discs covered with various harmful organisms. The antagonistic effects of the bacteria and fungi used at 10° were assessed after a test period of four weeks. It can be learned from Table 1 that the antagonistic microorganisms used on wheat grains after the treatment with low energy electrons effectively prevent the attack of the germinating seeds and the embryo plant by soil-borne harmful organisms and result in a substantially higher combating efficiency than is possible through the seed treatment with low energy electrons only.

TABLE 1

Effects of the colonization with antagonistic microorganisms on wheat grains after treatment with low energy electrons

| Harmful organisms | wheat grains without colonization | after treatment with low energy electrons | | | | | | | | | |
|---|---|---|---|---|---|---|---|---|---|---|---|
| | | 1 | 2 | 3 | 4 | 5 | 6 | 7 | 8 | 9 | 10 |
| Fusarium avenaceum | T | ++ | ++ | ++ | +++ | ++ | + | + | + | +++ | + |
| Fusarium culmorum | T | ++ | ++ | ++ | +++ | ++ | + | + | + | +++ | + |
| Fusarium graminearum | T | ++ | ++ | −, ü | +++ | −, ü | + | + | −, ü | +++ | + |
| Microdochium nivale | T | ++ | ++ | + | +++ | ++ | + | + | + | + | + |
| Septoria nodorum | ü | nu | nu | nu | nu | nu | + | + | + | +++ | + |
| Drechelera teres | ü | ++ | ++ | ++ | nu | ++ | + | ++ | + | +++ | + |

TABLE 1-continued

Effects of the colonization with antagonistic microorganisms on wheat grains after treatment with low energy electrons

| Harmful organisms | wheat grains without colonization | after treatment with low energy electrons | | | | | | | | | |
|---|---|---|---|---|---|---|---|---|---|---|---|
| | | 1 | 2 | 3 | 4 | 5 | 6 | 7 | 8 | 9 | 10 |
| *Gaeumannomyces graminis* | ü | ++ | ++ | ++ | +++ | +++ | + | +++ | ++ | +++ | + |

Legend:
nu = not tested
+++ = strong inhibition with distinct inhibition zone
++ = inhibition with distinct inhibition zone
+ = growth stop of harmful organism without inhibition zone
− = no effects
T = seed corn or embryo plant died off
ü = seed corn or embryo plant grown over and damaged
1 ... 5 bacterial antagonists (IMET 11425, IMET 11 427, IMET 11 424, IMET 11 426, IMET 11 428)
6 ... 10 fungal antagonists (IMET 43 921, IMET 43 923, IMET 43 922, IMET 43 920, IMET 43 924)

We claim:

1. A seed treating process to combat organisms originating in seeds or soil which comprises:
   irradiating seeds with low energy electrons; and
   subsequently subjecting said seeds to an application of antagonistic bacterial or fungal microorganisms of genera selected from the group consisting of Bacillus, Pseudomonas, Trichoderma, Chaetomium, Epicoccum and Penicillium, which microorganisms are antagonistic to harmful fungal organisms in seeds or soil.

2. A process according to claim 1, wherein said seed treatment with antagonistic microorganisms against harmful fungal organisms is carried out immediately after the irradiation of the seeds with low energy electrons in a continuous process.

3. A process according to claim 1, wherein the seeds irradiated with low energy electrons are subjected to a treatment with antagonistic microorganisms against harmful fungal organisms prior to or during sowing.

4. A process according to claim 1, wherein the seeds are subjected to an irradiation with low energy electrons and the application of antagonistic bacteria or fungi which either remain on the surface of the seeds, in the sub-surface or interior region of the seed corn, colonize a surface region of the hypocotyl of the seed corn or undergo root associations and symbioses with an embryo plant following from the seeds.

5. A process according to claim 1, wherein antagonistic microorganisms are used as growing cells or in their dormant forms on conjunction with carrier substrates.

6. A process according to claim 5, wherein antagonistic microorganisms are used as growing cells or in their dormant form on carrier substrates, bound with at least one member selected from nutrients and bonding agents.

7. A process according to claim 5, wherein antagonistic microorganisms are used as nutrient suspensions.

8. A process according to claim 4, wherein bacterial and fungal antagonists and, in addition, the culture filtrates and metabolic products thereof are used.

9. A process according to claim 1, wherein the antagonistic activities take place within a temperature range of from 0.5° to 35° C.

10. A process according to claim 1, wherein said antagonistic micoorganism is a bacteria selected from the group consisting of IMET 11424, IMET 11425, IMET 11426, IMET 11427, and IMET 11428 or an antagonistic fungi selected from the group consisting of IMET 43920, IMET 43921, IMET 43922, IMET 43923, and IMET 43924, wherein said microorganisms are used at $10^4$ to $5 \times 10^{10}$ cfu/ml or g.

11. A process according to claim 1, wherein 10 to 5,000 ml or g of the antogonistic microorganisms are used per 100 kg of seeds.

* * * * *

UNITED STATES PATENT AND TRADEMARK OFFICE
CERTIFICATE OF CORRECTION

PATENT NO. : 5,409,509
DATED : April 25, 1995
INVENTOR(S) : Ulrich BURTH et al.

It is certified that error appears in the above-indentified patent and that said Letters Patent is hereby corrected as shown below:

On the title page:

At Item [73], please change "Gesellschaft fuer umweltschutz-beratung und-technik Gbr" to read --Gesellschaft fuer Umweltschutzberatung und -technik GbR--.

Signed and Sealed this

Seventh Day of May, 1996

Attest:

BRUCE LEHMAN

*Attesting Officer*   *Commissioner of Patents and Trademarks*